United States Patent
Park et al.

(10) Patent No.: US 11,256,099 B2
(45) Date of Patent: Feb. 22, 2022

(54) HEAD-MOUNTED DISPLAY APPARATUS

(71) Applicant: Samsung Electronics Co., Ltd., Suwon-si (KR)

(72) Inventors: Jung Hoon Park, Seoul (KR); Tae Hyung Kwon, Suwon-si (KR); Jung Soo Kim, Hwaseong-si (KR); Joong Kyung Park, Suwon-si (KR); Won Ho Shin, Suwon-si (KR); Young Gun Lee, Suwon-si (KR); Jin Choul Lee, Suwon-si (KR); Hyoung Gil Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 15/975,277

(22) Filed: May 9, 2018

(65) Prior Publication Data
US 2018/0364491 A1    Dec. 20, 2018

(30) Foreign Application Priority Data

Jun. 14, 2017 (KR) .......................... 10-2017-0074883

(51) Int. Cl.
*G02B 27/01* (2006.01)
*G06F 1/16* (2006.01)
(Continued)

(52) U.S. Cl.
CPC ..... *G02B 27/0176* (2013.01); *G02B 27/0172* (2013.01); *G06F 1/163* (2013.01); (Continued)

(58) Field of Classification Search
CPC .............. G02B 27/0176; G02B 23/125; G02B 27/0172; G02B 2027/0178; (Continued)

(56) References Cited

U.S. PATENT DOCUMENTS 2,887,928 A * 5/1959 Misuraca ............... G01P 3/40
356/25
4,457,461 A * 7/1984 Docking ................ G12B 9/08
2/422
(Continued)

FOREIGN PATENT DOCUMENTS

CN    105182533 A    12/2015
CN    105661735 A    6/2016
(Continued)

OTHER PUBLICATIONS

European Patent Office; Extended European Search Report; dated Nov. 13, 2018; Application No. 18176072.9-1020.
(Continued)

*Primary Examiner* — Adam J Waggenspack
(74) *Attorney, Agent, or Firm* — Jefferson IP Law, LLP

(57) ABSTRACT

A head-mounted display (HMD) apparatus includes a main body having a first surface facing a user's facial side, at least one connecting part connected to at least one surface of the main body, and a wearing part having a strap form, the wearing part being connected to the at least one connecting part and surrounding a portion of a head of the user such that the main body is held on the user's facial side. The main body includes a first support part extending from a portion of the first surface. The wearing part includes a second support part formed on an inner circumferential surface of a front portion of the wearing part facing a forehead of the user. The first support part and the second support part are supported on the user's forehead, thereby minimizing pressure exerted on zygomatic regions and relieving pressure and weight felt by the user.

19 Claims, 14 Drawing Sheets

(51) Int. Cl.
*G06F 3/01* (2006.01)
*G02C 3/02* (2006.01)

(52) U.S. Cl.
CPC ...... *G06F 3/011* (2013.01); *G02B 2027/0178* (2013.01); *G02C 3/02* (2013.01)

(58) Field of Classification Search
CPC .. A45F 2200/0541; G06F 1/163; G06F 3/011; G02C 3/02
USPC ........................................................ 224/181
See application file for complete search history.

(56) References Cited

U.S. PATENT DOCUMENTS

| | | | |
|---|---|---|---|
| 5,844,530 | A | 12/1998 | Tosaki |
| 6,931,668 | B2 | 8/2005 | Dobbie et al. |
| 6,986,162 | B2 | 1/2006 | Soto et al. |
| 7,107,624 | B2 | 9/2006 | Dobbie et al. |
| 7,484,646 | B1 * | 2/2009 | Holmes .................. B63C 11/12 224/181 |
| 9,366,871 | B2 * | 6/2016 | Ghosh .................. H04N 13/286 |
| 9,703,103 | B2 * | 7/2017 | Araki ....................... G09G 5/00 |
| 9,733,480 | B2 * | 8/2017 | Baek ..................... H05K 5/0004 |
| 9,810,911 | B2 * | 11/2017 | Miller ................... H05K 999/99 |
| 2003/0115661 | A1 | 6/2003 | Dobbie et al. |
| 2004/0181858 | A1 | 9/2004 | Soto et al. |
| 2005/0183189 | A1 | 8/2005 | Dobbie et al. |
| 2016/0299346 | A1 * | 10/2016 | Allin ................... G02B 27/0176 |
| 2016/0363772 | A1 | 12/2016 | Miller et al. |
| 2016/0370590 | A1 | 12/2016 | Fujishiro |
| 2016/0372279 | A1 * | 12/2016 | Yamazaki .......... G02B 27/0172 |
| 2017/0017085 | A1 | 1/2017 | Araki et al. |
| 2018/0059424 | A1 | 3/2018 | Miller et al. |
| 2019/0159354 | A1 * | 5/2019 | Zheng ..................... A42B 1/24 |
| 2020/0050235 | A1 * | 2/2020 | Yoon ...................... G02B 27/01 |

FOREIGN PATENT DOCUMENTS

| | | |
|---|---|---|
| CN | 106257320 A | 12/2016 |
| CN | 205958848 U | 2/2017 |

OTHER PUBLICATIONS

Chinese Office Action dated Jul. 23, 2021, issued in Chinese Application No. 201810605899.8.

* cited by examiner

HEAD-MOUNTED DISPLAY APPARATUS

CROSS-REFERENCE TO RELATED APPLICATION(S)

This application is based on and claims priority under 35 U.S.C. § 119(a) of a Korean patent application number 10-2017-0074883, filed on Jun. 14, 2017, in the Korean Intellectual Property Office, the disclosure of which is incorporated by reference herein in its entirety.

TECHNICAL FIELD

The disclosure relates to a head-mounted display (HMD) apparatus.

BACKGROUND

In recent years, wearable electronic devices that can be directly worn on a human body have been widely used. Since the wearable electronic devices can be used while worn on a part of a human body, for example, a wrist, an ankle, a neck, a waist, a head, or the like, mobility and portability of the wearable electronic devices is greatly improved. As an example of the wearable electronic devices, a head-mounted display (HMD) apparatus, which is worn on a user's head to display images, may include a wearing part (e.g., a band) for wearing the HMD apparatus on the head.

The wearing part of the HMD may be tightened around a wearer's head to surround a portion of the wearer's head such that the main body of the HMD is held on the wearer's facial side. For example, the wearing part of the HMD may be tightened while located on an upper portion of the wearer's head in a form that surrounds the forehead, the top of the head, and the occipital region (hereinafter, referred to as a top band form) and may be supported on the upper portion of the wearer's head. In another example, the wearing part of the HMD may be tightened while located on a lateral portion of the wearer's head in a form that surrounds the forehead, the temporal region, and the occipital region (hereinafter, referred to as a side band form) and may be supported on the wearer's forehead and occipital region. In another example, the wearing part of the HMD may be implemented by a combination of the two forms described above. For example, the wearing part of the HMD may include a top band and a side band.

The above information is presented as background information only, to assist with an understanding of the disclosure. No determination has been made, and no assertion is made, as to whether any of the above might be applicable as prior art with regard to the disclosure.

SUMMARY

In the case where the wearing part of the head-mounted display (HMD) is implemented in a top band form, the main body of the HMD may be pressed against and held on the wearer's facial side, and therefore pressure exerted on the facial side may increase and cause the wearer to feel uncomfortable. Furthermore, if the top band is loosened to reduce the pressure exerted on the facial side, the main body of the HMD may slide down the facial side to press the zygomatic regions to increase weight felt by the wearer, and when the head moves, the main body of the HMD may shake, and therefore the wearer may feel that the HMD is less secure.

In the case where the wearing part of the HMD is implemented in a side band form, the main body of the HMD may slide down due to the weight thereof and therefore may not be stably supported when the head moves. Furthermore, if the side band is tightened to bear the weight of the HMD main body, pressure exerted on the forehead and the occipital region may increase and cause the wearer to feel uncomfortable.

Even in the case where the wearing part of the HMD includes both a top band and a side band, pressure exerted on the facial side may act as in the case where the wearing part of the HMD is implemented in a top band form, and the wearer may similarly feel uncomfortable.

Aspects of the disclosure are to address at least the above-mentioned problems and/or disadvantages and to provide at least the advantages described below. Accordingly, an aspect of the disclosure is to provide an HMD apparatus having a dual support structure that supports an upper portion and a lower portion of a user's forehead.

In accordance with an aspect of the disclosure, an HMD apparatus is provided. The HMD apparatus includes a main body having a first surface configured to face a user's facial side, at least one connecting part connected to at least one surface of the main body, and a wearing part having a strap form, configured to connect to the at least one connecting part and surrounding a portion of a head of the user such that the main body is held on the user's facial side. The main body comprises a first support part extending from a portion of the first surface. The wearing part comprises a second support part disposed on an inner circumferential surface of a front portion of the wearing part that faces a forehead of the user. The first support part and the second support part are configured to be supported on the user's forehead to minimize undesired pressure.

According to various embodiments of the disclosure, by supporting both an upper portion and a lower portion of a user's forehead, it is possible to minimize pressure exerted on zygomatic regions, thereby relieving pressure and weight felt by the user.

Furthermore, according to various embodiments of the disclosure, by bringing a main body of an HMD into close contact with a wearer's forehead, it is possible to stably support the main body of the HMD even when the wearer's head moves, thereby increasing a comfortable fit.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
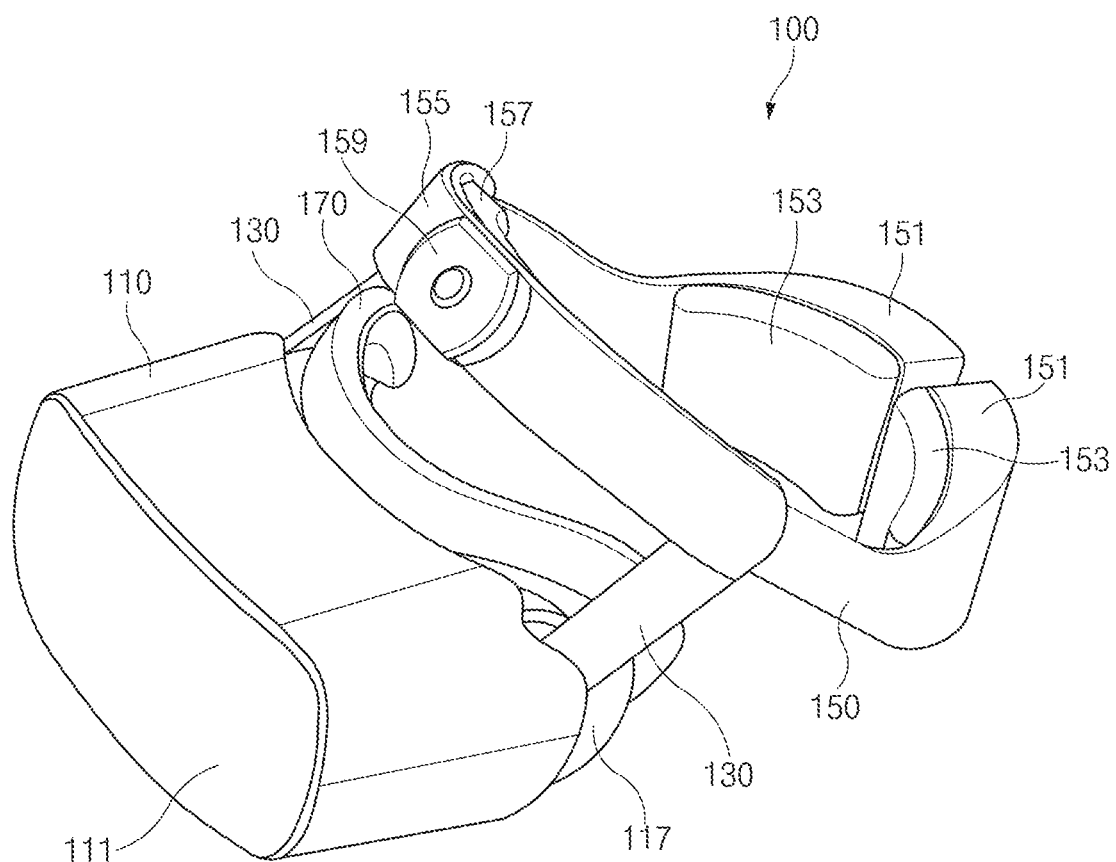
FIG. 1 illustrates a perspective view of a head-mounted display (HMD) apparatus when viewed in a first direction according to an embodiment of the disclosure.
Figure 2:
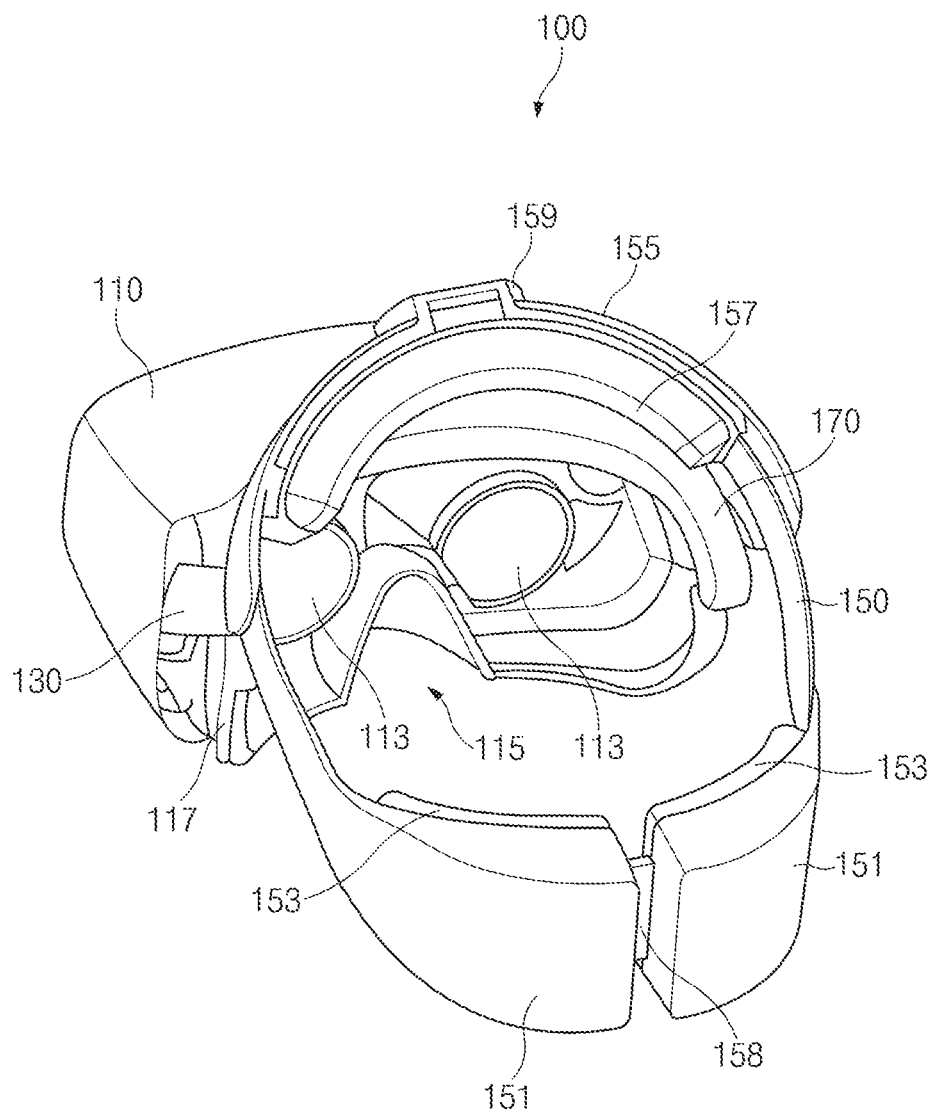
FIG. 2 illustrates a perspective view of an HMD apparatus when viewed in a second direction according to an embodiment of the disclosure.
Figure 3:
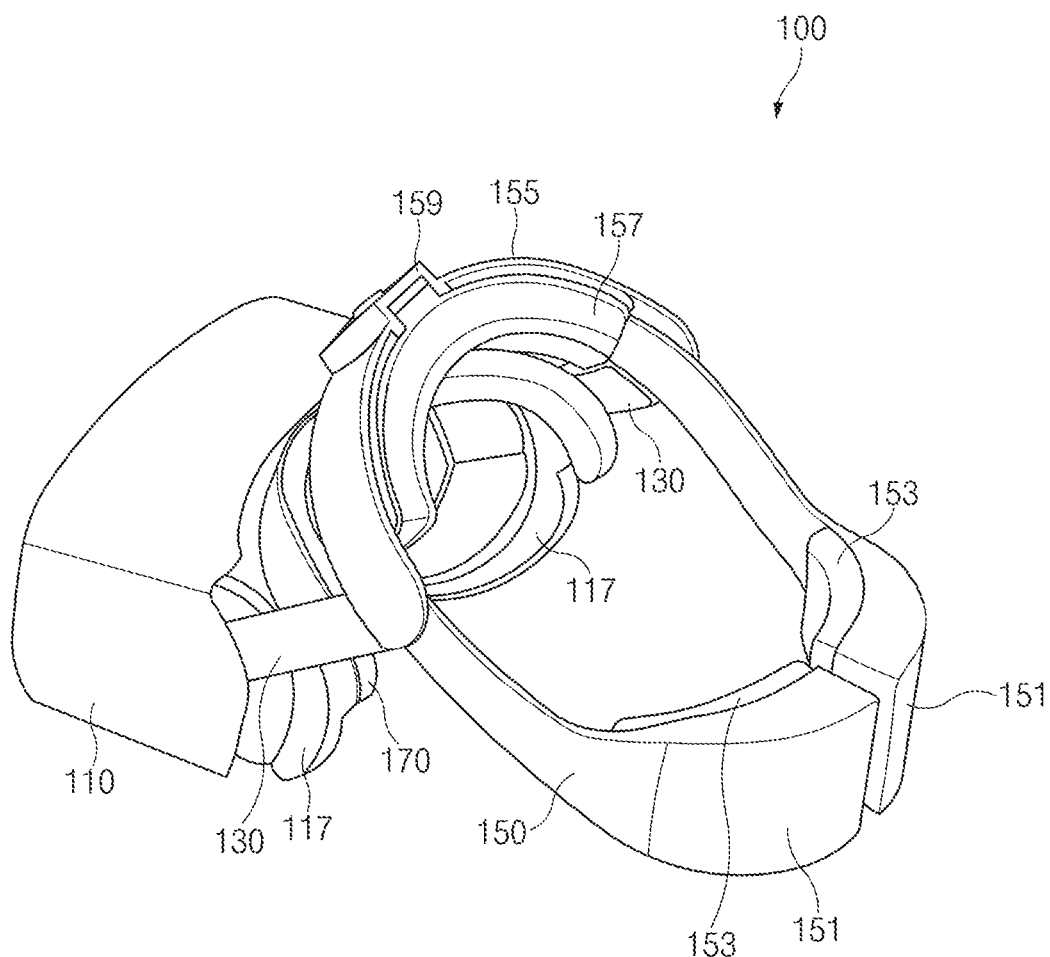
FIG. 3 illustrates a perspective view of an HMD apparatus when viewed in a third direction according to an embodiment of the disclosure.

FIG. 1 illustrates a perspective view of a head-mounted display (HMD) apparatus when viewed in a first direction according to an embodiment of the disclosure. FIG. 2 illustrates a perspective view of an HMD apparatus when viewed in a second direction according to an embodiment of the disclosure. FIG. 3 illustrates a perspective view of an HMD apparatus when viewed in a third direction according to an embodiment of the disclosure.

Referring to FIGS. 1 to 3, an HMD apparatus 100 may include a main body 110 (or a main frame), connecting parts 130, and a wearing part 150.

The main body 110 may be held on at least a part (e.g., a facial side) of a user's face and may be supported on the user's facial side by various elements. According to an embodiment, the main body 110 may be made of such a light material that the user experiences a comfortable fit. In some embodiments, in the case where an external electronic device (e.g., a smartphone) is attached to the main body 110, the main body 110 may be made of a material, such as plastic, which is capable of supporting the external electronic device and sufficiently light that the user experiences a comfortable fit. Also, a material for protecting the HMD 100 may be further included in the main body 110.

According to another embodiment, the material for protecting the HMD 100 may include at least one of various materials for strength or beauty, such as glass, plastic (e.g., Acrylonitrile Butadiene Styrene (ABS) or polycarbonate), ceramic, metal (e.g., aluminum), or metal alloy (e.g., steel, stainless steel, titanium, or magnesium alloy).

Although not illustrated, the main body 110 may include one or more of an input unit, a display position adjustment unit, and a lens-fixing unit, and may include, on a front surface thereof, a front case having a space or structure where an external electronic device (not shown) can be mounted.

According to an embodiment, the input unit may include a control device or a user input module that controls the HMD 100 or the external electronic device. According to an embodiment, the input unit may be disposed on a surface (e.g., a side surface) of the main body 110 and may include at least one of a touch pad, a physical key, a physical button, a touch key, a joystick, or a wheel key. According to an embodiment, the input unit may provide a graphic user interface for controlling functions of the HMD 100 or functions of the external electronic device. For example, a graphical user interface (GUI) for sound settings may be used to adjust audio volume output from the HMD 100 or the external electronic device, and a GUI for image reproduction may be used to control an image displayed on a display of the HMD 100 or a display of the external electronic device. Furthermore, the input unit may receive a touch or hovering inputs of the user.

According to an embodiment, the display position adjustment unit may be implemented in the form of a wheel or a dial. When the user turns the wheel or dial with which the display position adjustment unit is implemented, an apparatus for supporting the display of the HMD 100 or the external electronic device may move to adjust the distance between the user and the display of the HMD 100 or the display of the external electronic device. As a result, the user may view an image that is appropriate for the user's vision or that is optimally displayed. In an embodiment, when the user operates the display position adjustment unit, the HMD 100 may move the apparatus for supporting the display of the HMD 100 or the external electronic device closer to or further from the user. In an embodiment, the front case may be moved in response to the operation of the display position adjustment unit.

According to an embodiment, the lens-fixing unit may fix lenses 113. In an embodiment, the display or the transparent/ translucent lenses 113 may be integrally or detachably fixed to the lens-fixing unit. In an embodiment, a lens assembly may be inserted between the display and the user's eyes.

According to an embodiment, the front case may correspond to the external appearance of the external electronic device. In an embodiment, the front case may include an elastic material or a flexible material and may change in size or shape to receive external electronic devices with various sizes.

According to an embodiment, the main body 110 may further include a connector to communicate with the external electronic device attached to the main body 110. In an embodiment, the connector may include a universal serial bus (USB) connector that is connected to an electrical connection part (e.g., a USB port) of the external electronic device and may transmit a signal of a GUI supplied by the input unit to the external electronic device through an electrical connection part of the USB connector. Furthermore, the connector may transmit, to the external electronic device, a touch or hovering input received through the input unit. In this case, the external electronic device may control a function corresponding to the touch or hovering input, in response to the touch or hovering input received from the HMD 100. For example, the external electronic device may adjust volume or control image reproduction in response to the received touch or hovering input.

According to an embodiment, the HMD 100 may further include a cover that is coupled to the main body 110 to firmly support the external electronic device on the main body 110 while the external electronic device is attached to the main body 110. The cover may be physically coupled in a hook form to the main body 110, or may be coupled to the main body 110 in the same way as a magnet or an electromagnet. As described above, the cover may prevent the external electronic device from being separated from the main body 110 and may improve an aesthetic impression while forming the external appearance of the main body 110.

According to an embodiment, the main body 110 may include, on a front surface thereof, a window 111 that serves to improve an aesthetic impression through various materials and colors. The window 111 may be made of a plastic material, such as a polycarbonate (PC) or an acrylic resin. Alternatively, the window 111 may be made of glass, sapphire, or ceramic, such as transparent ceramic. In another case, the window 111 may be made of metal, such as aluminum or stainless steel (SUS). Among the above-described materials, a transparent material may have a chromatic color, and the transparency of the chromatic color may be electronically adjusted.

According to an embodiment, the main body 110 may further include one or more openings. The openings may easily release heat generated from the main body 110 and/or the external electronic device to the outside of the main body 110 to lower the temperature of the main body 110 and/or the external electronic device, thereby preventing performance degradation of the main body 110 and/or the external electronic device. Furthermore, the one or more openings may make the weight of the main body 110 light to reduce the total weight, thereby contributing to weight lightening.

According to an embodiment, the main body 110 may include a first support part 170 extending from a portion of a rear surface of the main body 110. The first support part 170 may extend from a portion of the circumference of the rear surface of the main body 110. According to an embodiment, the first support part 170 may include a first portion extending from an upper side of the rear surface of the main body 110, a second portion extending from a portion of a left side (e.g., an upper portion of the left side) of the rear surface of the main body 110, and a third portion extending from a portion of a right side (e.g., an upper portion of the right side) of the rear surface of the main body 110. The first portion of the first support part 170 may extend a first length from the upper side of the rear surface of the main body 110 while making a first angle with the upper side of the rear surface of the main body 110, the second portion of the first support part 170 may extend a second length from a portion of the left side of the rear surface of the main body 110 while making a second angle with the left side of the rear surface of the main body 110, and the third portion of the first support part 170 may extend a third length from a portion of the right side of the rear surface of the main body 110 while making a third angle with the right side of the rear surface of the main body 110. In this case, the second angle and the third angle may be substantially the same as each other, and the directions in which the first portion and the second or third portion extend from the rear surface of the main body 110 may make a specified angle (e.g., a right angle) together.

According to an embodiment, the first support part 170 may be brought into contact with the user's facial side. For example, the first support part 170 may be brought into contact with an area from a lower portion of the user's forehead to the temples. In an embodiment, the first support part 170 may include a material that serves as a buffer between the main body 110 and the user's head. For example, the first support part 170 may include foam in a form that extends from the lower portion of the forehead to the temples. The first support part 170 may be brought into contact with the lower portion of the forehead and the temples to cover the lower portion of the forehead and a portion of the temples, thereby enabling the main body 110 to be supported by the lower portion of the forehead and the temples.

According to an embodiment, the main body 110 may include a light-shielding part 117 extending from a portion of the rear surface of the main body 110. The light-shielding part 117 may be formed on a portion of the circumference of the rear surface of the main body 110, except for the portion from which the first support part 170 extends. For example, the light-shielding part 117 may be formed on a lower portion of the left side of the rear surface of the main body 110 and on a lower portion of the right side of the rear surface of the main body 110. According to an embodiment, the length by which the light-shielding part 117 extends from the portion of the rear surface of the main body 110 may be shorter than the length (e.g., the first length, the second length, or the third length) by which the first support part 170 extends from the portion of the rear surface of the main body 110. Accordingly, the light-shielding part 117 may not be brought into contact with the user's facial side when the first support part 170 is brought into contact with the user's facial side. When the light-shielding part 117 is not brought into contact with the user's facial side, this may mean that the rear surface of the main body 110 is not brought into contact with the user's zygomatic regions. The user may feel less pressure and weight since the rear surface of the main body 110 is not brought into contact with the user's zygomatic regions. In some embodiments, the light-shielding part 117 may be brought into contact with the user's facial side, for example, the zygomatic regions to increase a light shielding rate. However, even though the light-shielding part 117 is brought into contact with the user's facial side, pressure exerted on the user's facial side may be less than or equal to a specified magnitude, that is, may be insignificant since the light-shielding part 117 is shorter than the first support part 170. Consequently, the pressure exerted on the user's facial side may be minimized, and therefore pressure and weight felt by the user may be relieved.

In an embodiment, a portion of the first support part 170 may extend from a portion of the light-shielding part 117. For example, a lowermost section of the second portion and a lowermost section of the third portion of the first support part 170 may extend from an upper portion of the light-shielding part 117.

According to an embodiment, at least one of the first support part 170 and the light-shielding part 117 may be attached to the main body 110 so as to be detachable. An adhesive member may be located on a surface of at least one of the first support part 170 and the light-shielding part 117, and at least one of the first support part 170 and the light-shielding part 117 may be attached to/detached from the main body 110 through the adhesive member. The adhesive member may be, but is not limited to, hook and loop connectors (Velcro tape), an adhesive, or the like, and any detachable adhesive member may be used as the adhesive member. Accordingly, in the case where the HMD 100 is used by several users, the users may select, install and use a first support part 170 and a light-shielding part 117 that are suitable for the users (e.g., suitable for an adult and a child that have different facial contours), and in the case where the first support part 170 and the light-shielding part 117 are contaminated (e.g., by cosmetics) or damaged due to frequent use, the first support part 170 and the light-shielding part 117 may be replaced with new ones.

According to an embodiment, the main body 110 of the HMD 100 may be easily worn on the user's facial side by the first support part 170 and the light-shielding part 117 described above. For example, the main body 110, which includes the first support part 170 and the light-shielding part 117, may have a shape or structure that covers the user's eyes and may include a nose recess 115 in which the user's nose is located.

According to an embodiment, the lens assembly including the at least one lens 113 may be located on the inside of the main body 110 to face the user's eyes. Furthermore, at least one surface of the lens 113 may be exposed in the direction of the rear surface of the main body 110 to enable the user to view a screen on the display with his/her eyes when the HMD 100 is worn on the user's facial side.

According to an embodiment, the wearing part 150 may be coupled to a portion of the main body 110 through the connecting parts 130 to allow the main body 110 to be supported on the user's facial side, thereby enabling the user to have the HMD 100 on. According to an embodiment, the wearing part 150 may be tightened around the user's head to surround a portion of the user's head. For example, the wearing part 150 may have a strap form and may be tightened around the user's head to traverse an area from the user's forehead to the occipital region via the temporal regions.

According to an embodiment, the wearing part 150 may include a second support part 157 that makes contact with an upper portion of the user's forehead. The second support part 157 may be formed on a front portion 155 of the wearing part 150 when the HMD 100 is viewed from the front, and may be formed on a portion of an inner circumferential surface of the front portion 155 of the wearing part 150 when the wearing part 150 is viewed from above. As illustrated in FIGS. 1 to 3, the second support part 157 may be concavely curved toward the center of the wearing part 150 along an inner circumferential surface of the wearing part 150 that has a strap form. The HMD 100 may have a dual support structure in which the first support part 170 extending from a surface of the main body 110 is supported on a lower portion of the user's forehead and the second support part 157 formed on a portion of the inner circumferential surface of the front portion 155 of the wearing part 150 is supported on an upper portion of the user's forehead.

According to an embodiment, the wearing part 150 may include a third support part 153 that makes contact with the user's occipital region. The third support part 153 may be formed on a rear portion 151 of the wearing part 150 when the HMD 100 is viewed from the front, and may be formed on a portion of an inner circumferential surface of the rear portion 151 of the wearing part 150 when the wearing part 150 is viewed from above. FIGS. 1 to 3 illustrate that a total of two third support parts 153 are formed on the rear portion 151 of the wearing part 150, in which one is formed on a left rear portion of the wearing part 150 and the other is formed on a right rear portion of the wearing part 150. However, the disclosure is not limited thereto. According to various embodiments, the third support part 153 may be formed in an integrated form that extends from the left rear portion to the right rear portion. In an embodiment, considering that the HMD 100 is likely to be worn for a long time, at least one of the second support part 157 and the third support part 153 may include at least one cushion material, such as sponge, to provide a comfortable fit.

According to an embodiment, the rear portion 151 of the wearing part 150 may be made of a hard material with an elastic value below a specified magnitude. As illustrated in FIG. 2, the rear portion 151 of the wearing part 150 may be divided into the left rear portion and the right rear portion, and an elastic member 158 with an elastic value above a specified magnitude may be disposed between the left rear portion and the right rear portion to connect the left rear portion and the right rear portion. The elastic member 158, which connects the left rear portion and the right rear portion, may be variable in length due to the elastic force thereof, and therefore the entire length of the wearing part 150 may be varied depending on the size of the user's head.

According to an embodiment, the wearing part 150 may be made of a hard material with an elastic value below a specified magnitude. Furthermore, the wearing part 150 may include a length adjustment part 159 for adjusting the length of the wearing part 150 in accordance with the circumference of the user's head. Since the length of the wearing part 150 is adjusted by the length adjustment part 159, the wearing part 150 may allow the main body 110 to be held closer to the user's eyes. In an embodiment, the length adjustment part 159 may include a gear, Velcro tape, a magnet, or the like.

According to an embodiment, the connecting parts 130 may connect the main body 110 and the wearing part 150. In an embodiment, each of the connecting parts 130 may be disposed on a surface (e.g., a side surface) of the main body 110. FIGS. 1 to 3 illustrate that two connecting parts 130 are disposed on left and right side surfaces of the main body 110, respectively.

According to an embodiment, each of the connecting parts 130 may be connected to a surface of the main body 110 while making a specified angle with a virtual normal line that connects the center (e.g., the center of gravity) of the main body 110 and the rear surface of the main body 110. For example, the connecting part 130 may be connected with a surface of the main body 110 to make a specified angle with the ground when the main body 110 is placed on the ground such that the bottom of the side surface of the main body 110 makes contact with the ground. A structure of the connecting part 130 will be described below in detail with reference to FIGS. 7 to 9.

Figure 4:
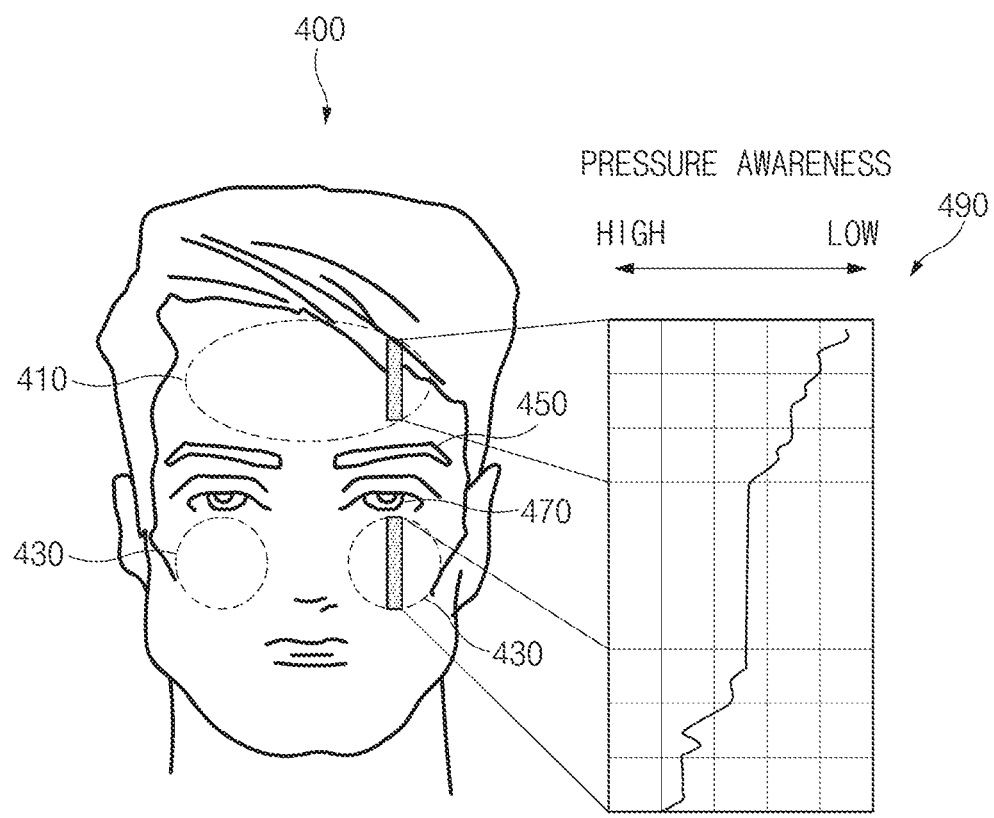
FIG. 4 is a view for explaining a correlation between a location of pressure exerted on a facial side and pressure awareness according to an embodiment of the disclosure.
Figure 5:
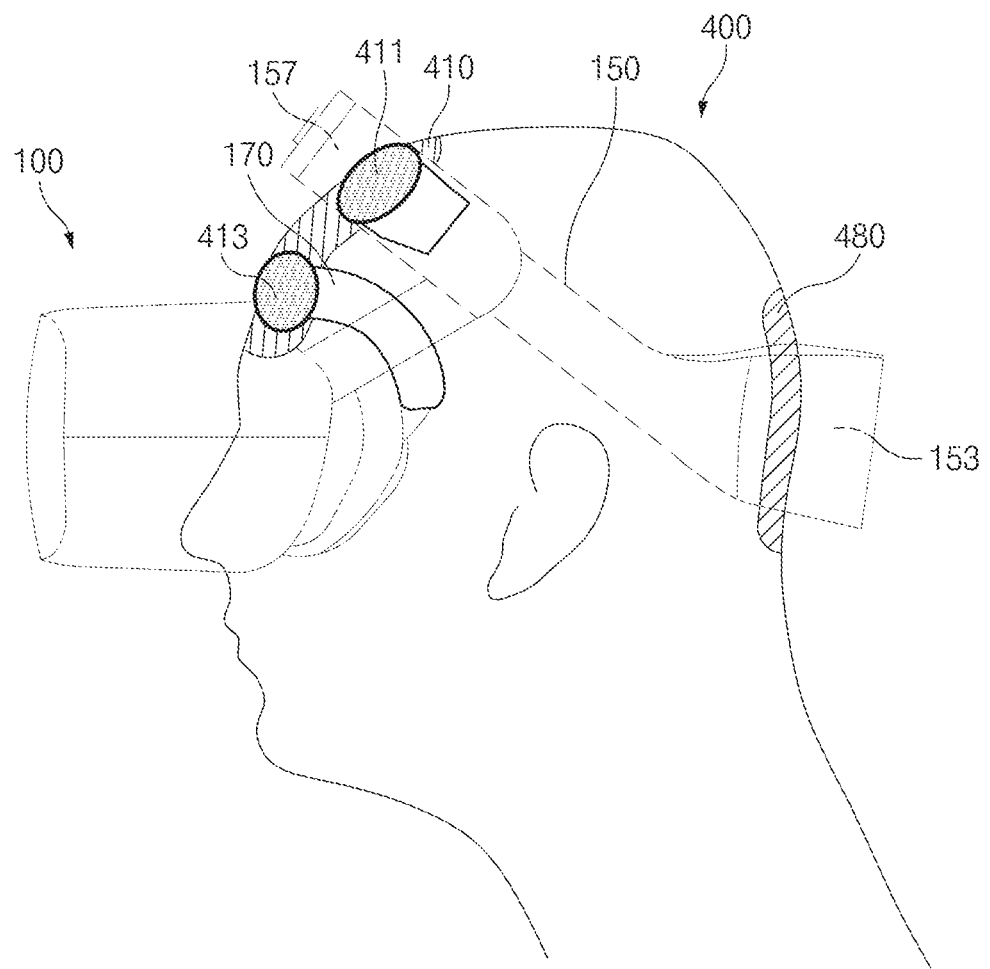
FIG. 5 is a view for explaining a state in which an HMD apparatus is worn on a facial side according to an embodiment of the disclosure.
Figure 6:
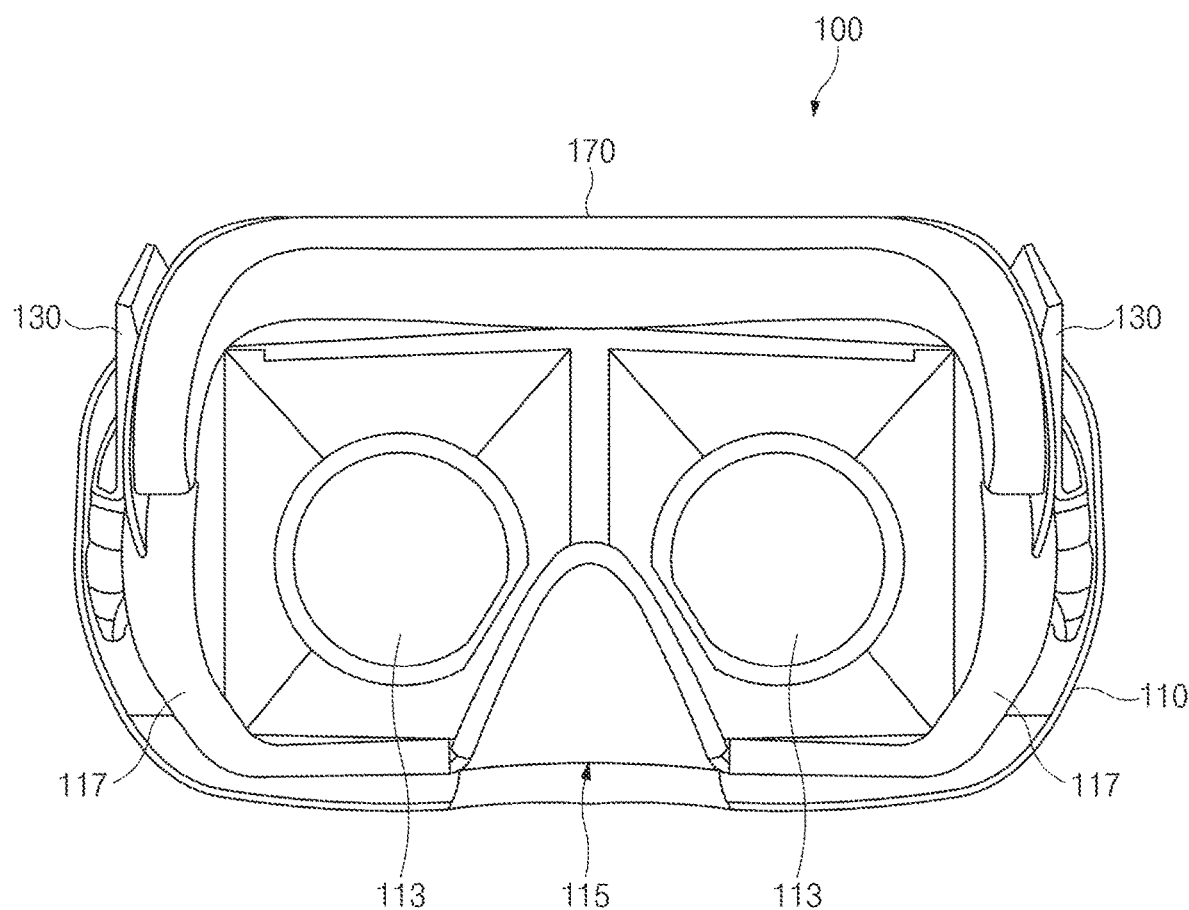
FIG. 6 is a view for explaining a portion where a main body of an HMD apparatus is brought into contact with a facial side according to an embodiment of the disclosure.

FIG. 4 is a view for explaining a correlation between a location of pressure exerted on a facial side and pressure awareness according to an embodiment of the disclosure. FIG. 5 is a view for explaining a state in which an HMD apparatus is worn on a facial side according to an embodiment of the disclosure. FIG. 6 is a view for explaining a portion where a main body of an HMD apparatus is brought into contact with a facial side according to an embodiment of the disclosure.

Referring to FIGS. 4 to 6, as shown in graph 490 of pressure awareness, a forehead 410 of a user 400, which is on an upper side of eyebrows 450, may have lower sensitivity to pressure than zygomatic regions 430 on a lower side of eyes 470. That is, when an object is supported on the forehead 410, the user 400 may feel less pressure than when the object is supported on the zygomatic regions 430. Accordingly, the HMD 100 according to the disclosure may be designed to be supported on the forehead 410 rather than the zygomatic regions 430 of the user 400 when supported on the facial side of the user 400.

According to an embodiment, the HMD 100 may be designed in a dual support structure in which the first support part 170 extending from a surface of the main body 110 is supported on a lower portion 413 of the forehead 410 and the second support part 157 formed on a portion of the inner circumferential surface of the front portion 155 of the wearing part 150 is supported on an upper portion 411 of the forehead 410.

According to an embodiment, since the first support part 170 extends from a surface (e.g., the rear surface) of the main body 110, the first support part 170 may directly support the main body 110. Accordingly, the first support part 170 may stably support the main body 110 even when the head of the user 400 moves. Furthermore, the first support part 170 may include foam in a form that extends leftward and rightward from the lower portion 413 of the forehead 410 to the temples, and the foam may make contact with the forehead 410 to cover the lower portion 413 of the forehead 410 and a portion of the temples and may serve as a buffer between the main body 110 and the head of the user 400. According to an embodiment, the first support part 170 may extend from a portion of a surface (e.g., the rear surface) of the main body 110, and the light-shielding part 117 may be formed on another portion thereof. For example, the first support part 170 may include the first portion extending from the upper side of the rear surface of the main body 110, the second portion extending from an upper portion of the left side of the rear surface of the main body 110, and the third portion extending from an upper portion of the right side of the rear surface of the main body 110, and the light-shielding part 117 may be formed on lower portions of the left and right sides of the rear surface of the main body 110. The light-shielding part 117 may prevent external light from being input to the main body 110, that is, the lenses 113 when the HMD 100 is worn on the facial side of the user 400. Since the light-shielding part 117 extends from the surface of the main body 110 by a length shorter than the length by which the first support part 170 extends, the light-shielding part 117 may not be brought into contact with the facial side of the user 400 and may serve to simply block light from the outside. Consequently, since the light-shielding part 117 applies no load to the zygomatic regions 430, the user 400 may feel less pressure, and therefore fatigue may be reduced.

According to an embodiment, the second support part 157 may be formed on a portion of the inner circumferential surface of the front portion 155 of the wearing part 150 and may be supported on the upper portion 411 of the forehead 410. Furthermore, the second support part 157 may be concavely curved toward the center of the wearing part 150 and thus may be brought into close contact with the upper portion 411 of the forehead 410. Accordingly, the user 400 may feel a more comfortable fit.

According to an embodiment, the wearing part 150 may further include the third support part 153 that makes contact with an occipital region 480 of the user 400. The third support part 153 may be formed on a portion of the inner circumferential surface of the rear portion 151 of the wearing part 150. In an embodiment, considering that the HMD 100 is likely to be worn for a long time, at least one of the second support part 157 and the third support part 153 may include at least one cushion material, such as sponge, to provide a comfortable fit.

According to an embodiment, the main body 110 of the HMD 100 may be easily worn on the facial side of the user 400 using the first support part 170 and the light-shielding part 117. For example, the main body 110, which includes the first support part 170 and the light-shielding part 117, may have a shape or structure that covers the eyes 470 of the user 400 and may include the nose recess 115 in which the nose of the user 400 is located.

Figure 7:
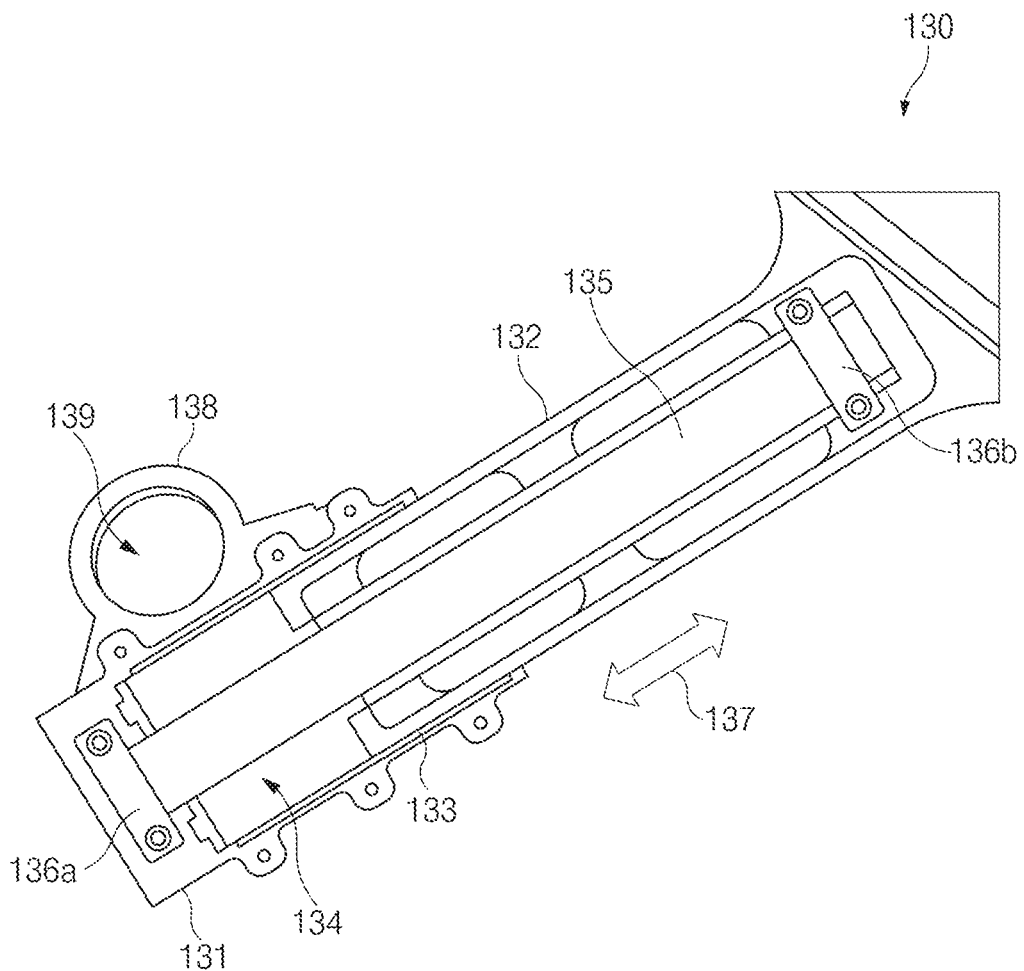
FIG. 7 illustrates a connecting part of an HMD apparatus according to an embodiment of the disclosure.
Figure 8:
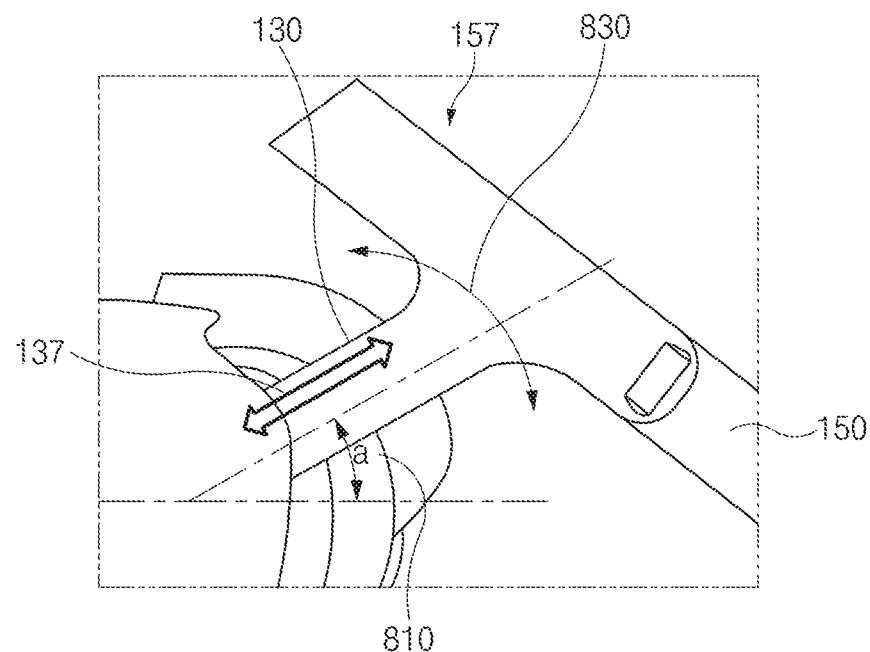
FIG. 8 is a view for explaining a rotary motion and a horizontal motion of a connecting part according to an embodiment of the disclosure.
Figure 9:
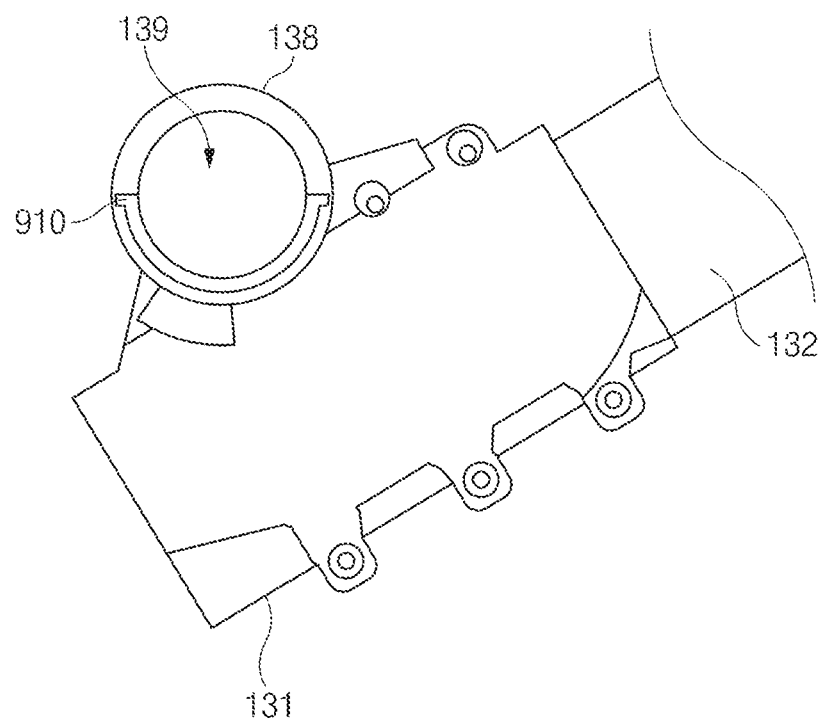
FIG. 9 is a view for explaining a rotation angle of a connecting part according to an embodiment of the disclosure.

FIG. 7 illustrates a connecting part of an HMD apparatus according to an embodiment of the disclosure. FIG. 8 is a view for explaining a rotary motion and a horizontal motion of a connecting part according to an embodiment of the disclosure. FIG. 9 is a view for explaining a rotation angle of a connecting part according to an embodiment of the disclosure.

Referring to FIGS. 7 to 9, the connecting part 130 may connect the main body 110 and the wearing part 150. In an embodiment, the connecting part 130 may be disposed on a surface (e.g., a side surface) of the main body 110 and may connect the main body 110 and the wearing part 150 to make a specified angle (a) 810 with the ground, without being parallel to the ground. For example, the connecting part 130 may be connected with a side surface of the main body 110 to make the specified angle 810 with the ground when the main body 110 is placed on the ground such that the bottom of the side surface of the main body 110 makes contact with the ground. The specified angle 810 may range, for example, from 10 degrees to 50 degrees, but embodiments are not limited thereto.

According to an embodiment, the connecting part 130 may include a fastening part 131 and a moving part 132. The fastening part 131 may be fastened to a surface of the main body 110. According to an embodiment, the fastening part 131 may have a through-hole 139 into which a shaft formed on the surface of the main body 110 is inserted. The through-hole 139 may be formed in the center of a center-of-rotation part 138 formed on a side of the fastening part 131. For example, the center-of-rotation part 138 may be formed in the shape of a ring on a side of the fastening part 131, and the through-hole 139 may be formed in the center of the ring. Accordingly, the fastening part 131 may perform a rotary motion 830 about the center-of-rotation part 138 (or the shaft) when the shaft formed on the surface of the main body 110 is inserted into the through-hole 139. In an embodiment, an angle by which the fastening part 131 is able to rotate may range from 10 degrees to 50 degrees, but embodiments are not limited thereto.

According to an embodiment, the fastening part 131 may be fastened to the surface of the main body 110 at the specified angle 810 by a frictional force with a specified magnitude. Accordingly, the fastening part 131 may perform the rotary motion 830 only when a force greater than the frictional force is applied to the fastening part 131.

According to an embodiment, the moving part 132 may be inserted into an inner side 134 of the fastening part 131, and may perform a horizontal motion 137 along a guide rail 133 formed on an inner surface of the fastening part 131. For example, the moving part 132 may be inserted into the inner side 134 of the fastening part 131 along the guide rail 133 formed on the inner surface of the fastening part 131 and may move leftward and rightward at the specified angle 810 along the guide rail 133 (see reference numeral 137).

According to an embodiment, the moving part 132 may be connected with the fastening part 131 through an elastic member 135. For example, the elastic member 135 may have one end fixed to a first fixing part 136a formed on the inner side 134 of the fastening part 131 and an opposite end fixed to a second fixing part 136b formed on a side of the moving part 132. Accordingly, a moving range of the moving part 132 may be limited by the elastic member 135 when the moving part 132 moves along the guide rail 133. For example, the elastic member 135 may have an elastic value above a specified magnitude and may prevent the moving part 132 from being separated from the fastening part 131 when the moving part 132 moves outside the fastening part 131 along the guide rail 133. Furthermore, due to the elastic force of the elastic member 135, the user 400 may easily move the moving part 132 in the horizontal direction to wear the HMD 100, and the HMD 100 may be stably held on the head. Consequently, the inclined angle 810 of the connecting part 130 and the elastic force may serve to move the main body 110 upward to bring the main body 110 into stable contact with the forehead 410 of the user 400 and may serve to reduce a sense of weight of the main body 110. Furthermore, since the elastic force serves to retract the wearing part 150, the wearing part 150 may be firmly held on the head of the user 400.

According to an embodiment, the connecting part 130 may further include a stopper 910 that limits an angle by which the fastening part 131 is able to rotate. For example, the rotary motion 830 of the fastening part 131 may be limited within a specified angle range by the stopper 910. The specified angle range may be, for example, a range of 10 degrees to 50 degrees, but embodiments are not limited thereto. The stopper 910 may be formed on a portion of an inner circumferential surface of the center-of-rotation part 138. For example, the stopper 910 may be formed on a lower portion of the inner circumferential surface of the center-of-rotation part 138. In this case, the stopper 910 may restrict the fastening part 131 from rotating downward about the center-of-rotation part 138 (or the shaft). Accordingly, the main body 110 may be prevented from pulling to a lower position. As a result, it is possible to prevent a load from being applied to the zygomatic regions 430 and to add a load to the forehead 410, thereby enhancing a sense of security felt by the user 400. In addition, it is possible to reduce interference with the head when the user 400 wears the HMD 100, thereby increasing usability. In an embodiment, the stopper 910 may include a torsion spring, but embodiments are not limited thereto.

Figure 10:
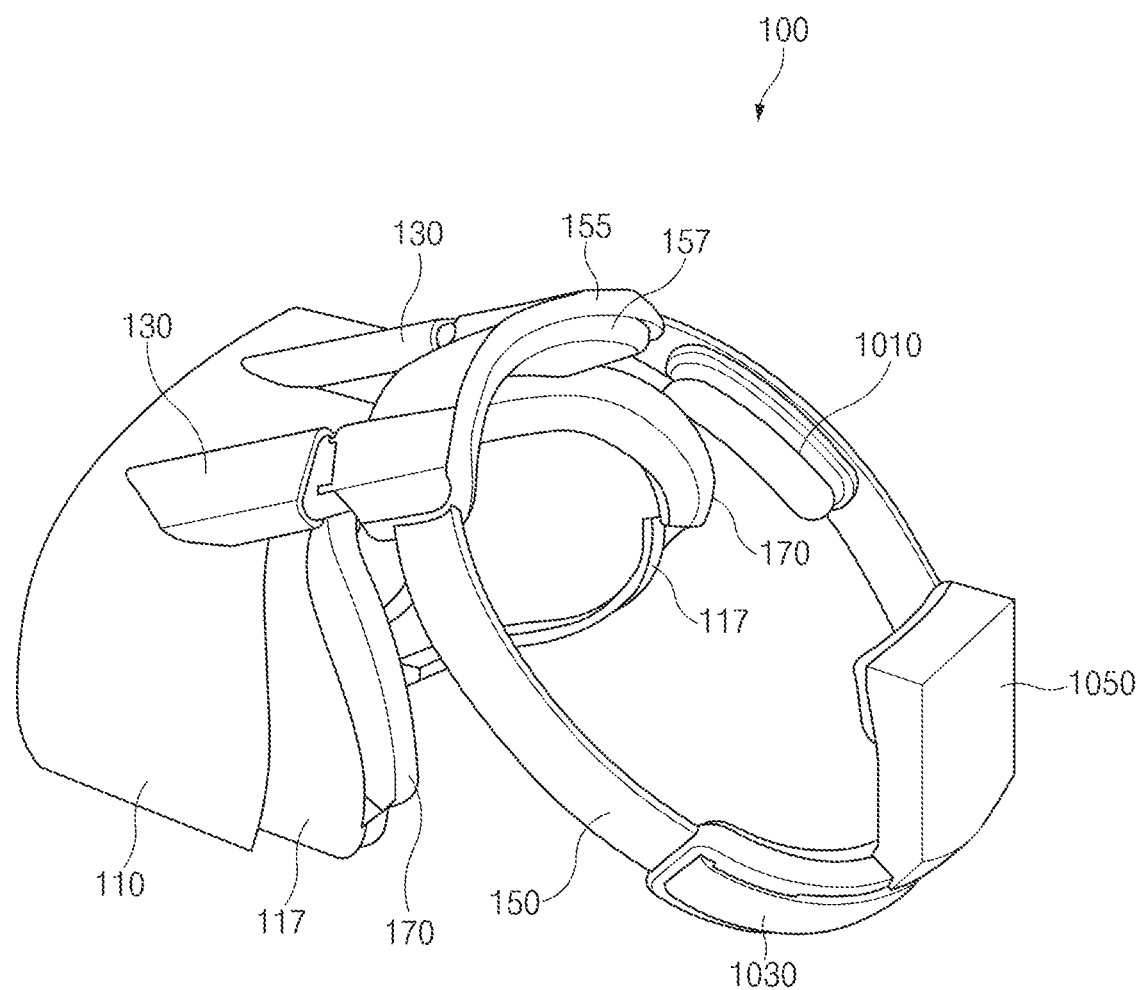
FIG. 10 is a view for explaining positions and numbers of connecting parts according to an embodiment of the disclosure.

FIG. 10 is a view for explaining positions and numbers of connecting parts according to an embodiment of the disclosure.

Referring to FIG. 10, the connecting parts 130 may be connected to at least one surface of the main body 110. According to an embodiment, the connecting parts 130 may be connected to both side surfaces of the main body 110, respectively. For example, a first connecting part may be connected to the right side surface of the main body 110, and a second connecting part may be connected to the left side surface of the main body 110. In another embodiment, as illustrated in FIG. 10, both the first connecting part and the second connecting part may be connected to an upper side surface of the main body 110. However, the number of connecting parts 130 and the positions to which the connecting parts 130 are connected are not limited thereto. According to various embodiments, a single connecting part 130 may be connected to the main body 110, or three or more connecting parts 130 may be connected to the main body 110. For example, a first connecting part may be connected to the left side surface of the main body 110, a second connecting part may be connected to the right side surface of the main body 110, and a third connecting part may be connected to the upper side surface of the main body 110.

According to an embodiment, the wearing part 150 may further include a fourth support part 1010 that makes contact with a temporal region of the user 400. The fourth support part 1010 may be formed on a lateral portion of the wearing part 150 when the HMD 100 is viewed from the front, and may be formed on a portion of an inner circumferential surface of the lateral portion of the wearing part 150 when the wearing part 150 is viewed from above. While FIG. 10 illustrates that the fourth support part 1010 is formed on a right side portion of the wearing part 150, the disclosure is not limited thereto. According to various embodiments, the fourth support part 1010 may be formed on a left side portion of the wearing part 150, or two fourth support parts 1010 may be formed on the left and right side portions of the wearing part 150, respectively. In an embodiment, the fourth support part 1010 may include a cushion material, such as sponge.

According to an embodiment, the wearing part 150 may include a structure 1030 for adjusting the length of the wearing part 150 in accordance with the circumference of the head of the user 400. For example, the structure 1030 (e.g., the length adjustment part 159) may make the entire length of the wearing part 150 longer or shorter. The structure 1030 may include, for example, a gear, Velcro tape, a magnet, or the like. While FIG. 10 illustrates that the structure 1030 is formed on the rear portion 151 of the wearing part 150, the disclosure is not limited thereto. In some embodiments, the structure 1030 may be formed on the front portion 155 of the wearing part 150.

According to an embodiment, the wearing part 150 may further include a fifth support part 1050 for stably supporting the occipital region of the user 400. As illustrated in FIG. 10, the fifth support part 1050 may extend upward from a section of the rear portion 151 of the wearing part 150. The fifth support part 1050 may have a contact surface with any suitable or desirable size. Since the contact surface of the fifth support part 1050, which is brought into contact with the occipital region of the user 400, has such a size, the fifth support part 1050 may have a wide area brought into contact with the occipital region of the user 400, thereby stably supporting the occipital region of the user 400.

Figure 11:
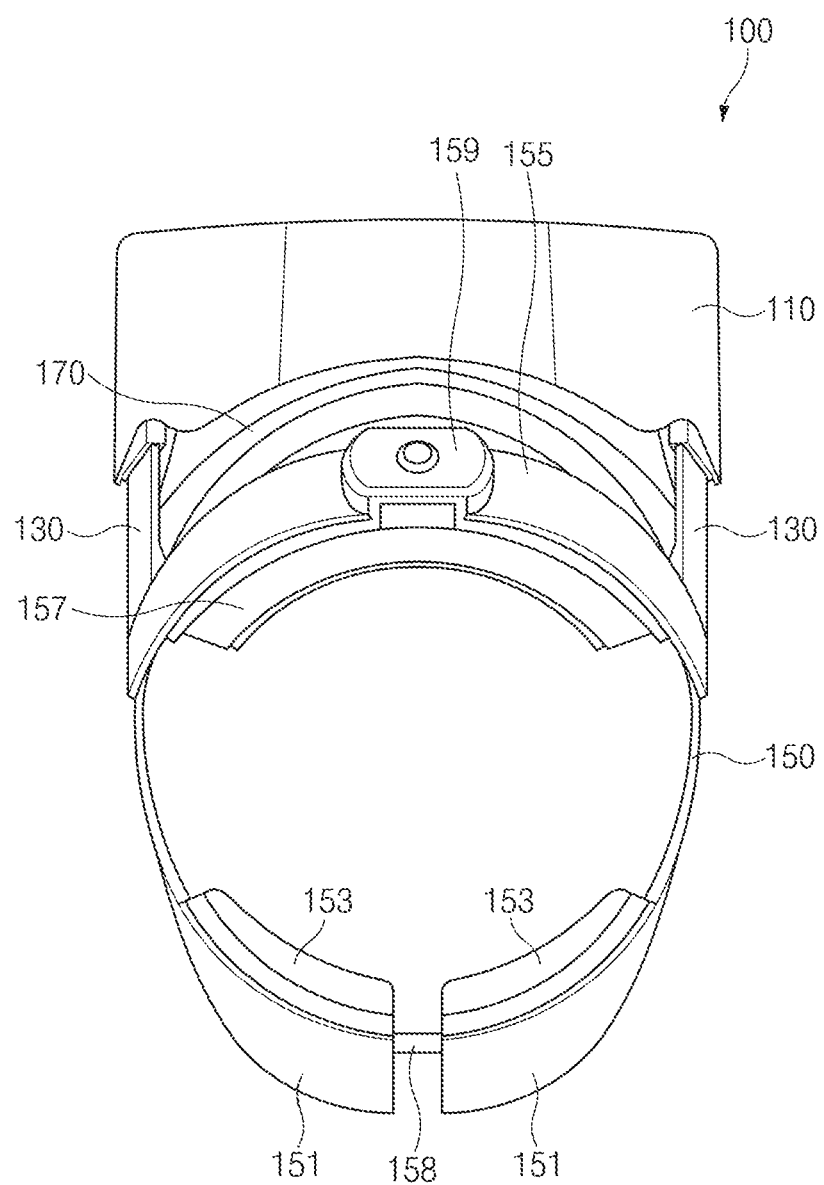
FIG. 11 is a view for explaining a structure for adjusting a length of a wearing part of an HMD apparatus according to an embodiment of the disclosure.
Figure 12:
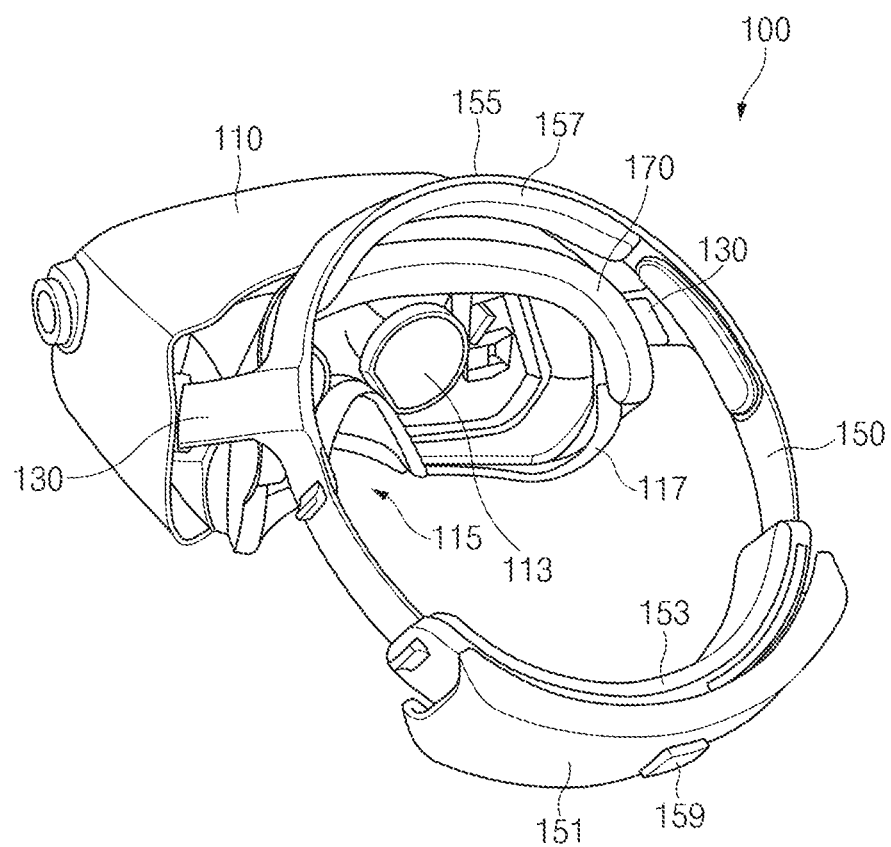
FIG. 12 is a view for explaining another structure for adjusting a length of a wearing part according to an embodiment of the disclosure.

FIG. 11 is a view for explaining a structure for adjusting a length of a wearing part of an HMD apparatus according to an embodiment of the disclosure. FIG. 12 is a view for explaining another structure for adjusting a length of a wearing part according to an embodiment of the disclosure.

Referring to FIGS. 11 and 12, the wearing part 150 may include the length adjustment part 159 for adjusting the length of the wearing part 150. The length adjustment part 159 may be disposed on a portion of the wearing part 150 to make the entire length of the wearing part 150 longer or shorter.

According to an embodiment, as illustrated in FIG. 11, the length adjustment part 159 may be disposed on the front portion 155 of the wearing part 150. For example, the length adjustment part 159 may be disposed on an outer circumferential surface of the front portion 155 of the wearing part 150. In the case where the length adjustment part 159 is disposed on the front portion 155 of the wearing part 150, the rear portion 151 of the wearing part 150 may be divided into the left rear portion and the right rear portion, and the elastic member 158 with an elastic value above a specified magnitude may be disposed between the left rear portion and the right rear portion to connect the left rear portion and the right rear portion. Accordingly, the wearing part 150 made of a hard material with an elastic value below the specified magnitude may maintain the desired shape thereof even without a separate guide. The elastic member 158 disposed on the rear portion 151 of the wearing part 150 may allow the wearing part 150 to stably surround the head of the user 400 and may enable fine adjustment to the length of the wearing part 150 to increase the comfort that the user 400 experiences when wearing the HMD 100, irrespective of the circumference of the head of the user 400.

Referring to FIG. 12, the length adjustment part 159 may be disposed on the rear portion 151 of the wearing part 150. For example, the length adjustment part 159 may be disposed on an outer circumferential surface of the rear portion 151 of the wearing part 150.

Figure 13:
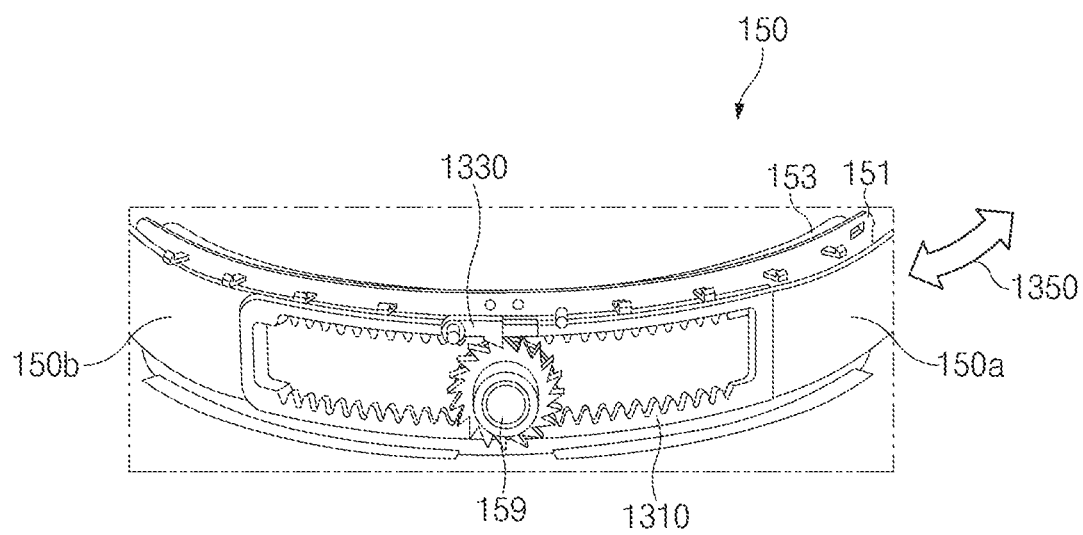
FIG. 13 is a view for explaining an internal structure of a length adjustment part of FIG. 12 according to an embodiment of the disclosure.

FIG. 13 is a view for explaining an internal structure of a length adjustment part of FIG. 12 according to an embodiment of the disclosure.

Referring to FIG. 13, the length of the wearing part 150 may be adjusted by the length adjustment part 159 in accordance with the circumference of the head of the user 400. According to an embodiment, the wearing part 150 may have a long strap form, opposite ends of which are separated from each other. For example, the wearing part 150 may include a first portion 150a extending rightward from a central portion thereof and a second portion 150b extending leftward from the central portion. In this case, the first portion 150a and the second portion 150b of the wearing part 150 may overlap each other on the rear portion 151 (or the front portion 155) of the wearing part 150. Furthermore, the first portion 150a and the second portion 150b of the wearing part 150 may include a connecting structure in an overlapping area thereof. For example, as illustrated in FIG. 13, a rack apparatus 1310 may be used as a structure that connects the first portion 150a and the second portion 150b. The portions where the first portion 150a and the second portion 150b overlap each other may include different rack gears, and the different rack gears may be arranged to overlap each other. For example, a first rack gear formed on one end of the first portion 150a and a second rack gear formed on one end of the second portion 150b may be arranged to overlap each other. Furthermore, the length adjustment part 159 having a pinion gear form may be disposed to be engaged with the first rack gear and the second rack gear. Accordingly, when the user 400 turns the length adjustment part 159, which is operated using a dial (a rotary handle), the first and second rack gears engaged with the pinion gear may move in opposite directions 1350, and therefore the length of the wearing part 150 may be made longer or shorter in the left-right direction 1350. For example, when the user 400 turns the length adjustment part 159 in the clockwise direction, the first rack gear engaged with the pinion gear may move rightward, and the second rack gear may move leftward. Accordingly, the first portion 150a of the wearing part 150 may move rightward, and the second portion 150b of the wearing part 150 may move leftward. As a result, the entire length of the wearing part 150 may be made longer. In another example, when the user 400 turns the length adjustment part 159 in the counter-clockwise direction, the first rack gear engaged with the pinion gear may move leftward, and the second rack gear may move rightward. Accordingly, the first portion 150a of the wearing part 150 may move leftward, and the second portion 150b of the wearing part 150 may move rightward. As a result, the entire length of the wearing part 150 may be made shorter. Furthermore, the rack apparatus 1310 may include a stopping member 1330 that allows the pinion gear to rotate only when a force above a specified magnitude is applied to the pinion gear.

As described above, according to various embodiments, an HMD apparatus (e.g., the HMD 100) may include a main body (e.g., the main body 110) having a first surface that faces a user's facial side, at least one connecting part (e.g., the connecting parts 130) connected to at least one surface of the main body, and a wearing part (e.g., the wearing part 150) having a strap form, the wearing part being connected to the at least one connecting part and surrounding a portion of a head of the user such that the main body is held on the user's facial side. The main body may include a first support part (e.g., the first support part 170) extending from a portion of the first surface. The wearing part may include a second support part (e.g., the second support part 157) formed on an inner circumferential surface of a front portion (e.g., the front portion 155) of the wearing part that faces a forehead of the user. The first support part and the second support part may be supported on the user's forehead.

According to various embodiments, the first support part may include a first portion extending from an upper side of the first surface, a second portion extending from a portion of a left side of the first surface, and a third portion extending from a portion of a right side of the first surface.

According to various embodiments, the HMD apparatus may further include a light-shielding part (e.g., the light-shielding part 117) extending from a portion of a circumference of the first surface, except for the portion from which the first support part extends.

According to various embodiments, a length by which the light-shielding part extends may be shorter than a length by which the first support part extends.

According to various embodiments, the first support part may include a material that serves as a buffer between the main body and the user's forehead.

According to various embodiments, the at least one connecting part may make a specified angle (e.g., the specified angle 810) with a virtual normal line that connects a center point of the main body and the first surface.

According to various embodiments, the specified angle may range from 10 degrees to 50 degrees, but embodiments are not limited thereto.

According to various embodiments, the at least one connecting part may include an elastic member (e.g., the elastic member 135) having an elastic value above a specified magnitude to horizontally move (e.g., the horizontal motion 137) in a direction inclined at the specified angle with respect to the virtual line.

According to various embodiments, the at least one connecting part may include a through-hole (e.g., the through-hole 139) into which a shaft formed on the at least one surface of the main body is inserted and the at least one connecting part may perform rotary motion (e.g., the rotary motion 830) about the shaft.

According to various embodiments, the at least one connecting part may further include a stopper (e.g., the stopper 910) that limits the rotary motion within a specified angle range.

According to various embodiments, the stopper may include a torsion spring.

According to various embodiments, the at least one connecting part may include a first connecting part connected to a second surface of the main body and a second connecting part connected to a third surface facing away from the second surface.

According to various embodiments, the at least one connecting part may include a first connecting part and a second connecting part that are connected to a second surface of the main body.

According to various embodiments, the wearing part may include a material having an elastic value below a specified magnitude.

According to various embodiments, the wearing part may further include a third support part (e.g., the third support part 153) formed on an inner circumferential surface of a rear portion (e.g., the rear portion 151) of the wearing part that faces an occipital region of the user.

According to various embodiments, the wearing part may further include an elastic member (e.g., the elastic member 158) on a rear portion (e.g., the rear portion 151) of the wearing part that faces an occipital region of the user, the elastic member having an elastic value above a specified magnitude.

According to various embodiments, the wearing part may further include a length adjustment part (e.g., the length adjustment part 159) that adjusts a length of the wearing part.

According to various embodiments, the length adjustment part may be formed on the front portion of the wearing part.

According to various embodiments, the length adjustment part may be formed on a rear portion of the wearing part that faces an occipital region of the user.

According to various embodiments, the length adjustment part may include at least one of a gear, Velcro tape, and a magnet.

Figure 14:
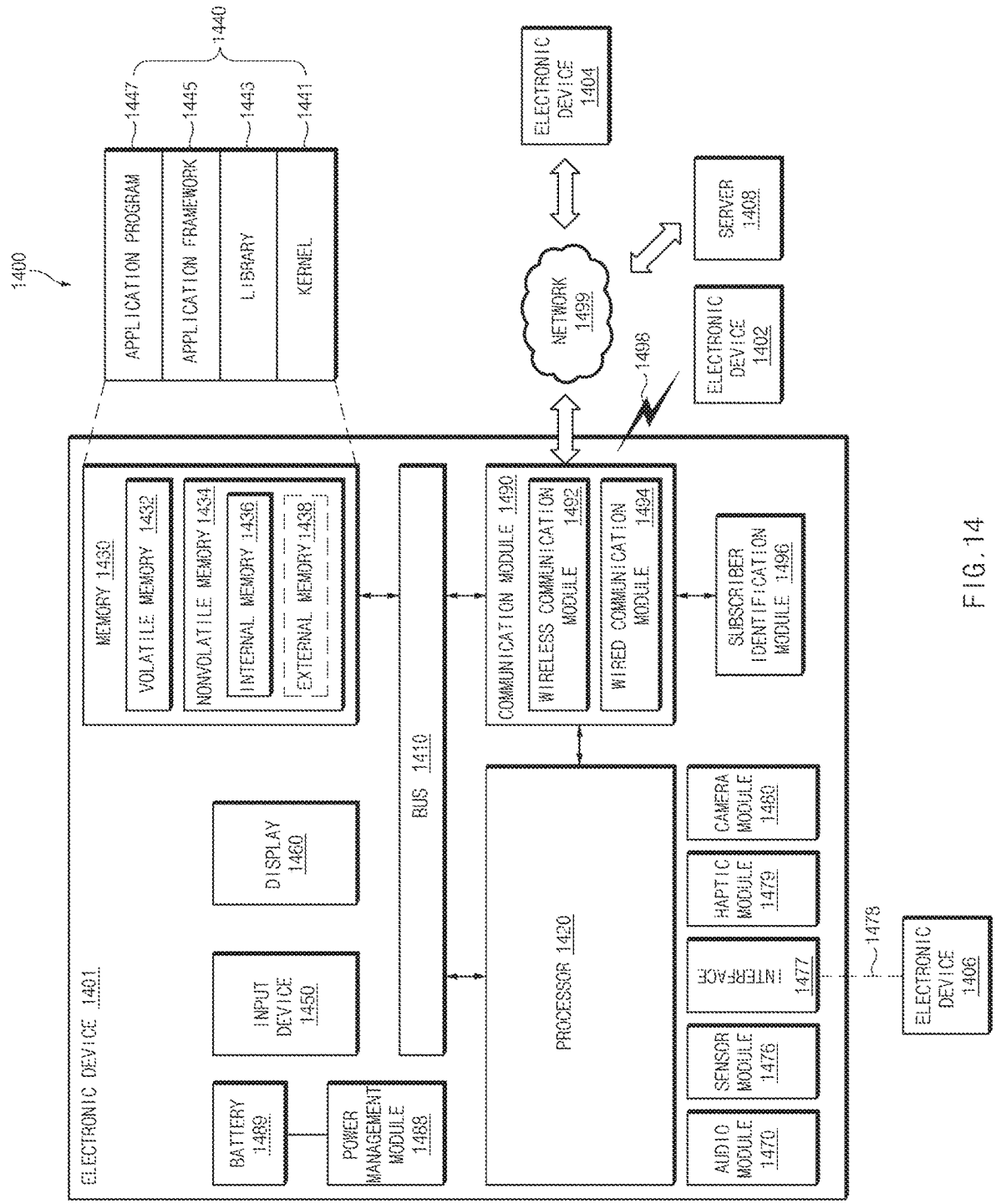
FIG. 14 illustrates a block diagram of an electronic device in a network environment according to various embodiments of the disclosure.

FIG. 14 illustrates a block diagram of an electronic device in a network environment according to various embodiments of the disclosure.

Referring to FIG. 14, in a network environment 1400, an electronic device 1401 (e.g., the HMD 100) may communicate with an electronic device 1402 through local wireless communication 1498 or may communicate with an electronic device 1404 or a server 1408 through a network 1499. According to an embodiment, the electronic device 1401 may communicate with the electronic device 1404 through the server 1408.

According to an embodiment, the electronic device 1401 may include a bus 1410, a processor 1420, a memory 1430, an input device 1450 (e.g., a micro-phone or a mouse), a display device 1460, an audio module 1470, a sensor module 1476, an interface 1477, a haptic module 1479, a camera module 1480, a power management module 1488, a battery 1489, a communication module 1490, and a subscriber identification module (SIM) 1496. According to an embodiment, the electronic device 1401 may not include at least one (e.g., the display device 1460 or the camera module 1480) of the above-described elements or may further include other element(s).

The bus 1410 may interconnect the above-described elements 1420 to 1490 and may include a circuit for conveying signals (e.g., a control message or data) between the above-described elements.

The processor 1420 may include one or more of a central processing unit (CPU), an AP, a graphics processing unit (GPU), and an image signal processor (ISP) of a camera or a communication processor (CP). According to an embodiment, the processor 1420 may be implemented with a system on chip (SoC) or a system in package (SiP). For example, the processor 1420 may drive an operating system (OS) or an application to control at least one of other elements (e.g., hardware or software element) connected to the processor 1420, and may process and compute various data. The processor 1420 may load a command or data, which is received from at least one of other elements (e.g., the communication module 1490), into a volatile memory 1432 to process the command or data, and may store the result data into a nonvolatile memory 1434.

The memory 1430 may include, for example, the volatile memory 1432 or the nonvolatile memory 1434. The volatile memory 1432 may include, for example, a random access memory (RAM) (e.g., a dynamic RAM (DRAM), a static RAM (SRAM), or a synchronous DRAM (SDRAM)). The nonvolatile memory 1434 may include, for example, a programmable read-only memory (PROM), a one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1434 may be configured in the form of an internal memory 1436 or in the form of an external memory 1438 which is available through connection if necessary, according to the connection with the electronic device 1401. The external memory 1438 may further include a flash drive such as a compact flash (CF), a secure digital (SD), a micro-SD, a mini-SD, an extreme digital (xD), a multi-media card (MMC), or a memory stick. The external memory 1438 may be operatively or physically connected with the electronic device 1401 in a wired manner (e.g., a cable or a USB) or in a wireless (e.g., Bluetooth) manner, or combinations thereof.

The memory 1430 may store, for example, at least one different software element, such as an instruction or data associated with a program 1440, of the electronic device 1401. The program 1440 may include, for example, a kernel 1441, a library 1443, an application framework 1445 or an application program (interchangeably, "application") 1447.

The input device 1450 may include a microphone, a mouse, or a keyboard. According to an embodiment, the keyboard may include a keyboard physically connected or a virtual keyboard displayed through the display 1460.

The display 1460 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the application and intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1401.

The audio module 1470 may convert, for example, from a sound into an electrical signal or from an electrical signal into a sound. According to an embodiment, the audio module 1470 may acquire sound through the input device 1450 (e.g., a microphone) or may output sound through an output device (not illustrated) (e.g., a speaker or a receiver) included in the electronic device 1401, an external electronic device (e.g., the electronic device 1402 (e.g., a wireless speaker or a wireless headphone)) or an electronic device 1406 (e.g., a wired speaker or a wired headphone) connected with the electronic device 1401.

The sensor module 1476 may measure or detect, for example, an internal operating state (e.g., power or temperature) of the electronic device 1401 or an external environment state (e.g., an altitude, a humidity, or a brightness) to generate an electrical signal or a data value corresponding to the information of the measured state or the detected state. The sensor module 1476 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1476 may further include a control circuit for controlling at least one or more sensors included therein. According to an embodiment, the sensor module 1476 may be controlled by using the processor 1420 or a processor (e.g., a sensor hub) separate from the processor 1420. In the case that a separate processor (e.g., a sensor hub) is used, while the processor 1420 is in a sleep state, the separate processor may operate without awakening the processor 1420 to control at least a portion of the operation or the state of the sensor module 1476.

According to an embodiment, the interface 1477 may include a high definition multimedia interface (HDMI), a USB, an optical interface, a recommended standard 232 (RS-232), a D-subminiature (D-sub), a mobile high-definition link (MHL) interface, a SD card/MMC interface, or an audio interface. A connector 1478 may physically connect the electronic device 1401 and the electronic device 1406. According to an embodiment, the connector 1478 may include, for example, an USB connector, an SD card/MMC connector, or an audio connector (e.g., a headphone connector).

The haptic module 1479 may convert an electrical signal into mechanical stimulation (e.g., vibration or motion) or into electrical stimulation. For example, the haptic module 1479 may apply tactile or kinesthetic stimulation to a user. The haptic module 1479 may include, for example, a motor, a piezoelectric element, or an electric stimulator.

The camera module 1480 may capture, for example, a still image and a moving picture. According to an embodiment, the camera module 1480 may include at least one lens (e.g., a wide-angle lens and a telephoto lens, or a front lens and a rear lens), an image sensor, an ISP, and a flash (e.g., a LED or a xenon lamp).

The power management module 1488, which is provided to manage the power of the electronic device 1401, may constitute at least a portion of a power management integrated circuit (PMIC).

The battery 1489 may include a primary cell, a secondary cell, or a fuel cell, and may be recharged by an external power source to supply power to at least one element of the electronic device 1401.

The communication module 1490 may establish a communication channel between the electronic device 1401 and an external device or devices (e.g., the first external electronic device 1402, the second external electronic device 1404, or the server 1408). The communication module 1490 may support wired communications or wireless communications through the established communication channel. According to an embodiment, the communication module 1490 may include one or more of a wireless communication module 1492 and a wired communication module 1494. The communication module 1490 may communicate with the external device through the first network 1498 (e.g. a wireless local area network (WLAN) such as Bluetooth or infrared data association (IrDA)) or the second network 1499 (e.g., a wireless wide area network such as a cellular network) through a relevant module among the wireless communication module 1492 or the wired communication module 1494.

The wireless communication module 1492 may support, for example, cellular communication, local wireless communication, and global navigation satellite system (GNSS) communication. The cellular communication may include, for example, long-term evolution (LTE), LTE-advanced (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), ZigBee, near field communication (NFC), magnetic secure transmission (MST), radio frequency (RF), or a body area network (BAN). The GNSS may include at least one of a global positioning system (GPS), a global navigation satellite system (Glonass), Beidou navigation satellite system (Beidou), the European global satellite-based navigation system (Galileo), or the like. In the disclosure, "GPS" and "GNSS" may be interchangeably used.

According to an embodiment, when the wireless communication module 1492 supports cellar communication, the wireless communication module 1492 may, for example, identify or authenticate the electronic device 1401 within a communication network using the SIM (e.g., a SIM card) 1496. According to an embodiment, the wireless communication module 1492 may include a CP separate from the processor 1420 (e.g., an AP). In this case, the CP may perform at least a portion of functions associated with at least one of elements 1410 to 1496 of the electronic device 1401 in substitute for the processor 1420 when the processor 1420 is in an inactive (sleep) state, and together with the processor 1420 when the processor 1420 is in an active state. According to an embodiment, the wireless communication module 1492 may include a plurality of communication modules, each supporting only a relevant communication scheme among cellular communication, local wireless communication, or GNSS communication.

The wired communication module 1494 may include, for example, a local area network (LAN) service, a power line communication, or a plain old telephone service (POTS).

For example, the first network 1498 may employ, for example, Wi-Fi direct or Bluetooth for transmitting or receiving commands or data through wireless direct connection between the electronic device 1401 and the first external electronic device 1402. The second network 1499 may include a telecommunication network (e.g., a computer network such as a LAN or a WAN, the Internet or a telephone network) for transmitting or receiving commands or data between the electronic device 1401 and the second electronic device 1404.

According to various embodiments, the commands or the data may be transmitted or received between the electronic device 1401 and the second external electronic device 1404 through the server 1408 connected with the second network 1499. Each of the first and second external electronic devices 1402 and 1404 may be a device of a same or different type as that of the electronic device 1401. According to various embodiments, all or part of operations that the electronic device 1401 performs may be executed by another electronic device or a plurality of other electronic devices (e.g., the electronic devices 1402 and 1404 or the server 1408). According to an embodiment, in the case that the electronic device 1401 executes any function or service automatically or in response to a request, the electronic device 1401 may not perform the function or the service internally, but may alternatively or additionally transmit requests for at least a part of a function associated with the electronic device 1401 to any other device or devices (e.g., the electronic device 1402 or 1404 or the server 1408). The other electronic device or devices (e.g., the electronic device 1402 or 1404 or the server 1408) may execute the requested function or additional function and may transmit the execution result to the electronic device 1401. The electronic device 1401 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modifications, equivalents, and/or alternatives to the corresponding embodiments described herein. With regard to the description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like, may include any and all combinations of one or more of the associated listed items. Expressions such as "first," or "second," and the like, may express elements regardless of their priority or importance and may be used to merely distinguish one element from another element, but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an application processor (AP)) which performs corresponding operations by executing one or more software programs which are stored in a memory device (e.g., the memory 1430).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof, or may be a minimum unit for performing one or more functions or a part thereof. The "module" may be implemented mechanically or electronically and may include, for example, an application-specific integrated circuit (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a non-transitory computer-readable storage media (e.g., the memory 1430) in the form of a program module. The instruction, when executed by a processor (e.g., a processor 1420), may cause the processor to perform a function corresponding to the instruction. The computer-readable recording medium may include a hard disk, a floppy disk, a magnetic media (e.g., a magnetic tape), an optical media (e.g., a compact disc-ROM (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, and a part of the above-described sub-elements may be omitted or may further include other sub-elements. Alternatively or additionally, after being integrated into one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of the operations may be executed in different sequences or omitted entirely. Alternatively, other operations may be added.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:
1. A head-mounted display (HMD) apparatus comprising:
a main body having a first surface configured to face a user's facial side;
at least one connecting part connected to a side surface of the main body; and a wearing part having a strap form, configured to connect to the at least one connecting part and surround a portion of a head of a user such that the main body is held on the user's facial side, wherein the main body comprises a first support part extending from a first portion of the first surface, and a light-shielding part extending from a second portion of the first surface of the main body and configured to be brought into contact with zygomatic regions of the user's facial side wherein the light-shielding part and the first support part surround a portion of the user's face including eyes wherein the light-shielding part extends shorter than the first support part in order to minimize pressure acting on the user's facial side, wherein the wearing part comprises a second support part disposed on an inner circumferential surface of a front portion of the wearing part that faces a forehead of the user, wherein the first support part and the second support part are configured to be supported on a user's forehead, wherein a first connecting part of the at least one connecting part is disposed on a first side surface of the main body and a second connecting part of the at least one connecting part is disposed on a second side surface of the main body opposite the first side surface, wherein a first connection point between the first support part and the first connecting part is spaced away from a second connection point between the second support part and the second connecting part, wherein the first support part is configured to be supported on a lower portion of the user's forehead and the second support part is configured to be supported on an upper portion of the user's forehead, wherein the second support part is configured to be disposed concavely towards a central point of the wearing part along an inner circumferential surface of the wearing part, wherein the wearing part is a curved band such that the central point of the wearing part is a center of the area defined by the curved band, wherein the first support part is spaced away from the second support part such that a location of the first support part is at a location below the second support part, wherein the at least one connecting part extends from the side surface of the main body to the wearing part at an inclined angle with respect to a ground, the inclined angle is defined as an angle measured with respect to the ground when the bottom surface of the main body is in contact with the ground, wherein the at least one connecting part comprises a fastening part fastened to the side surface of the main body, and a moving part connected with the fastening part through an elastic member inserted into an inner side of the fastening part, wherein the elastic member is configured to provide an elastic force acting upward at the inclined angle to the main body in order to reduce the pressure acting on the user's facial side, wherein the fastening part has a through-hole into which a shaft formed on the side surface of the main body is inserted, and wherein the at least one connecting part is configured to rotate about the shaft so that the inclined angle is in a range of 10 degrees to 50 degrees.

2. The HMD apparatus of claim 1, wherein the first support part comprises:

a first portion extending from an upper side of the first surface, a second portion extending from a portion of a left side of the first surface, and a third portion extending from a portion of a right side of the first surface.

3. The HMD apparatus of claim 2, further comprising:

a light-shielding part configured to extend from a portion of a circumference of the first surface, excluding a portion from which the first support part extends.

4. The HMD apparatus of claim 3, wherein a length by which the light-shielding part extends is shorter than a length by which the first support part extends.

5. The HMD apparatus of claim 1, wherein the first support part comprises a material configured to serve as a buffer between the main body and the user's forehead.

6. The HMD apparatus of claim 1, wherein the at least one connecting part further comprises:

an elastic member configured to horizontally move in a direction inclined at a specified angle.

7. The HMD apparatus of claim 1, wherein the at least one connecting part further comprises a through-hole configured to rotatably receive a shaft disposed on the side surface of the main body, and wherein the at least one connecting part is further configured to perform rotary motion about the shaft.

8. The HMD apparatus of claim 7, wherein the at least one connecting part further comprises a stopper configured to limit the rotary motion within a specified angle range.

9. The HMD apparatus of claim 8, wherein the stopper comprises a torsion spring.

10. The HMD apparatus of claim 1, wherein the at least one connecting part further comprises:

a third connecting part connected to an upper side surface of the main body.

11. The HMD apparatus of claim 1, wherein the first connecting part and the second connecting part are connected to upper side surface of the main body.

12. The HMD apparatus of claim 1, wherein the wearing part comprises an elastic material.

13. The HMD apparatus of claim 1, wherein the wearing part further comprises:

a third support part disposed on an inner circumferential surface of a rear portion of the wearing part that faces an occipital region of the user.

14. The HMD apparatus of claim 1, wherein the wearing part further comprises:

an elastic member on a rear portion of the wearing part configured to face an occipital region of the user, the elastic member having an elastic value above a specified magnitude.

15. The HMD apparatus of claim 1, wherein the wearing part further comprises a length adjustment part configured to adjust a length of the wearing part.

16. The HMD apparatus of claim 15, wherein the length adjustment part is disposed on the front portion of the wearing part.

17. The HMD apparatus of claim 15, wherein the length adjustment part is disposed on a rear portion of the wearing part that faces an occipital region of the user.

18. The HMD apparatus of claim 15, wherein the length adjustment part comprises at least one of a gear, a hook and loop connector, or a magnet.

19. The HMD apparatus of claim 1, wherein the first support part includes foam in a form that extends leftward and rightward from the lower portion of the user's forehead.

* * * * *